Nov. 15, 1949     E. L. HARDER     2,488,400
TOROIDAL COIL-TERMINAL BUSHING COUPLING POWER
LINE AND TELEPHONE CIRCUIT
Filed Dec. 17, 1948

WITNESSES:
H.F.Susser.

INVENTOR
Edwin L. Harder.
BY
ATTORNEY

Patented Nov. 15, 1949

2,488,400

UNITED STATES PATENT OFFICE 2,488,400

TOROIDAL COIL-TERMINAL BUSHING COUPLING POWER LINE AND TELEPHONE CIRCUIT

Edwin L. Harder, Pittsburgh, Pa., assignor to Westinghouse Electric Corporation, East Pittsburgh, Pa., a corporation of Pennsylvania Application December 17, 1948, Serial No. 65,961

5 Claims. (Cl. 179—2.5)

My invention relates to a carrier-current system in which the carrier-current is series-coupled to one of the line-conductors of the commercial-frequency power-transmission line on which the carrier-current is to be superimposed.

Heretofore, the carrier-current has usually been introduced into the power-transmission line by means of a shunt coupling, in the form of a coupling capacitor at each end of the line-section in which the carrier-current is to be circulated, in combination with a wave-trap at each end, for preventing the carrier-current from passing out of the line-section into the rest of the power-transmission system. Since the power-transmission line operates at a substantially high voltage, and carries a substantially large full line-current, the wave-trap had to be mounted physically in the high-voltage line, and had to carry the full line-current, while the coupling-capacitor had to be insulated for the full line-voltage. As a result, a rather considerable item of cost was involved, at each terminal, in connection with these line-connected wave-traps and coupling-capacitors, which may be described as power-size equipment.

Series carrier-coupling systems have also been known heretofore, in which the carrier-current was introduced into one of the line-conductors by means of a current-transformer, so that said line-conductor acted as one conductor of the carrier-current circuit, while the return-conductor for the carrier-current was provided, either through ground, or through another line-conductor, by means of short-circuiting capacitors or tuned circuits which permitted carrier-current flow between the selected line-conductor and the selected return-conductor, whether ground or another line-conductor. Here, again, the series current-transformer which was used for carrier-current coupling had to be mounted physically upon the line somewhere, spaced away from any other metallic supports, so as to avoid losses resulting from the stray flux from the current-transformer at the carrier-current frequency, and the short-circuiting capacitors or tuned circuits had to be designed for the full line-voltage, still resulting in a considerable cost for this power-size equipment which was required. The series-connected coupling-transformer, as heretofore used, had to be mounted in series with the power-line conductor away from other metallic supports, because it was designed as an impedance-matching transformer for matching the characteristic impedance of the power-line against the characteristic impedance of the carrier-current cable which was used to connect the coupling transformer to the carrier-current set.

The cost of the carrier-current set, not including the carrier-coupling equipment, is susceptible to reduction by known methods, but the cost of the power-size equipment which has been necessary for coupling, whether series or shunt coupling, has still remained high, thus tending to prevent the use of carrier-current equipment on many lines, particularly the shorter lines or the lines having lower operating-voltage.

An object of my present invention is to provide a series carrier-coupling system in which the coupling-means is in the form of a toroidal current-transformer which can be placed in close physical relation to the metal circuit-interrupter housing which is used at each terminal of the power-line section. In fact, the toroidal current-transformer can be disposed within one of the bushing-openings, in spaced relation around the corresponding terminal-bushing through which one of the line-conductors enters or leaves the metal circuit-interrupter housing. In this way, my coupling transformer is at substantially the ground-potential of the metal housing, and does not need to be insulated for the power-line voltage. The coupling-transformer has to have a carrier-frequency magnetizable core of toroidal shape, surrounded by a substantially uniform and symmetrically distributed winding extending substantially completely around said toroidal core, so that the high-frequency flux which is produced by the carrier-current will be confined to this toroidal core, so that there will be substantially no carrier-frequency leakage-flux which gets out into the metal housing surrounding the toroidal coupling-transformer. With this sort of equipment, the idea of matching the characteristic impedance of the power-line has to be abandoned, resulting in the entirely new concept of a series carrier-coupling without impedance-matching to the characteristic impedance of the power-line, which heretofore has been an unheard of thing to do, but which I have found, nevertheless, to be quite feasible, as will be subsequently pointed out.

A further object of my invention relates to means for using tapped condenser-bushings through the metal circuit-interrupter housing, with tuned circuits which may be tuned, either to provide a preferential ground-path for short-circuiting the selected line-conductor with respect to the carrier-frequency currents but not with respect to the power-frequency currents, or the tuned circuit can be adjusted to prevent the tapped bushing from permitting an unwanted leakage of the carrier-frequency current on the line-side of the coupling-transformer.

With the foregoing and other objects in view, my invention consists in the circuits, systems, combinations, structures, parts, and methods of design and use, hereinafter described and claimed, as illustrated in the accompanying drawing, wherein:

It may be desirable to clarify our terminology with respect to transmission lines. In electric light and power work, a transmission line, or more explicitly, a power-transmission line, may be defined as a plurality of line-conductors for transmitting power from a bus at one station to a bus at another station, said line-conductors usually having no more than two branch-lines (if any) connected thereto between said two stations, thus defining a transmission-line as distinguished from a distribution-line. In communication and high-frequency engineering, on the other hand, the term transmission-line is reserved exclusively for a network or a pair of conductors in which the physical dimensions are comparable to, or even much larger than, the wavelength of an alternating current flowing in it, or a network or a pair of conductors in which account must be taken of distributed capacitance or leakage. In carrier-current systems, the carrier-frequency is so high that the power-line conductor acts as a high-frequency transmission-line, so that the power-line conductor presents substantially its surge impedance to said carrier-currents. Most overhead power-lines have a surge-impedance of the order of 500 ohms, and this value is commonly taken as a representative surge-impedance value in carrier-current calculations. In my subsequent discussion, I will use the term transmission-line from the standpoint of the power engineer as well as from the standpoint of the communication engineer, but I will attempt to indicate, by the context, the sense in which I am using the term.

Figure 1:
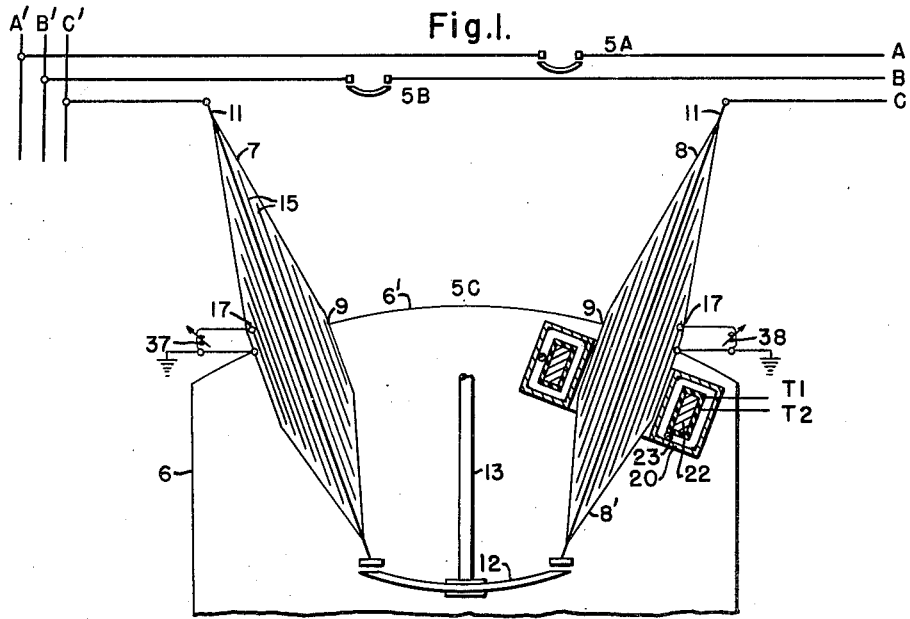
Figure 1 is a very diagrammatic view which is illustrative of my new carrier-current coupling-equipment.

In Fig. 1, I have shown my invention as applied to a terminal of a three-phase line-section ABC of a commercial-frequency electric-power transmission-system, such as a 60-cycle system. As each terminal of the line-section is identical, or may be identical, I have illustrated only one terminal, with the understanding that similar equipments will be used at the other end or ends of the line-section.

At the illustrated terminal or station, the line-section ABC is connected to a three-phase bus A'B'C' through circuit breakers 5A, 5B and 5C, of which the breakers 5A and 5B are indicated only schematically, while the breaker 5C is indicated (diagrammatically) somewhat more in detail. In general, except for the carrier-current equipment, the breakers 5A and 5B will be identical with the breaker 5C. These breakers 5A, 5B and 5C may be either oil-breakers or air-breakers. In every case, however, they will be enclosed in a metal tank or housing 6, usually steel, and they will have two condenser-type terminal-bushings 7 and 8, the bushing 7 being connected to the bus, while the bushing 8 is connected to the line. These bushings 7 and 8 extend through openings 9 in the metal housing 6, so as to lead the power-line conductor 11 into and out of the housing 6. Inside the housing 6, the circuit-breaker contacts 12 are disposed, under the control of an operating rod or mechanism 13, the details of which are not shown.

Each of the condenser-bushings 7 and 8 is composed of insulating wrappings, interspersed with a plurality of separate conducting layers such as metal foils 15, which serve to distribute the condenser-charges throughout the bushings. Various numbers of foils 15 may be used, depending upon the voltage. For the purpose of the present description, each condenser-bushing 7 and 8 may be thought of as having something like 10 foils in it.

Most condenser-bushings are provided with a low-voltage tap to one of the foils 15 near the outside of the bushing, so as to provide a voltage equal to one tenth or other fraction of the line-voltage, and such a tap is shown at 17, on each of the condenser-bushings 7 and 8 in Fig. 1.

Most or many condenser-bushings are also provided with an internally mounted toroidal transformer-case or housing 20, usually of iron or steel, which is slipped on, over the inner end 8' of the bushing 8, from the inside of the breaker-housing 6, after the bushing 8 has been inserted in its hole 9 in the top 6' of the breaker-housing 6, and before the breaker-parts 12 and 13 are assembled. There is usually room, in modern breakers, for two such transformer-cases 20, if two bushing-type transformers are wanted.

As my invention concerns only one such transformer (which will be of special construction), I have shown only one transformer-case 20, and it is associated with the line-connected condenser-bushing 8. Inside the transformer-case 20, there is a carrier-frequency magnetizable core 22 of toroidal shape, which is wound with a substantially uniform and symmetrically distributed winding 23 which extends all the way around the toroidal core 22, said winding having two terminals T1 and T2, as will be perhaps more clear from an inspection of Fig. 2. In general, the winding-turns will be as close together as the necessary insulation will permit, so that a large number of turns will be used, which may be called N, although, in the diagrammatic representation of Fig. 2, only a few turns are shown. It is necessary for the N turns on the toroidal core to be uniform and symmetrically distributed around the entire circumference of the core, so as to avoid stray carrier-frequency fluxes from existing outside of the winding. This is necessary, both to avoid severe energy-losses in the surrounding metal parts, and also in order to get as much carrier-frequency flux into the core as possible, so as to get as much carrier-current into the line-conductor 11 and C as possible. The requisites for the design of the toroidal core 22 will be discussed later on.

Figure 2:
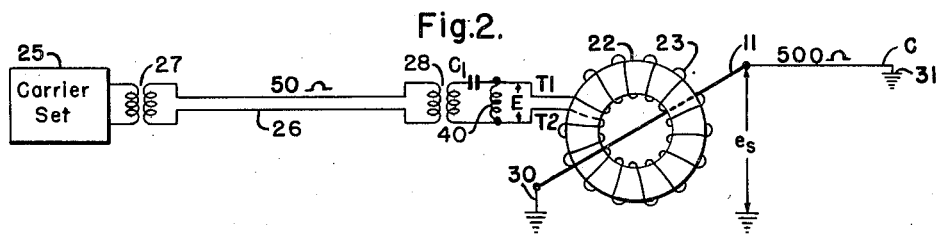
Figure 2 is an equivalent circuit-diagram of the entire carrier-current equipment, as seen from one of the terminals of the power-transmission line.

The essentials of the carrier-current equipment at the illustrated terminal of the line-section ABC are shown, by way of an equivalent diagram, in Fig. 2, wherein a block 25 represents the carrier-current set, which will usually be a transmitter-receiver set, for both transmitting and receiving carrier-currents, either at the same carrier-frequency, or at different carrier-frequencies. The carrier-set 25 is illustrated as being coupled to a carrier-current cable 26 through an impedance-matching transformer 27. The cable 26 may be visualized as having a characteristic impedance of the order of 50 ohms. The other end of the cable 26 is shown as being coupled, through another impedance-matching transformer 28, to the terminals T1 and T2 of the toroidal winding 23, in series with a capacitor $C_1$ which neutralizes the inductances of the windings 28 and 23 at the carrier-frequency.

It is important to note here that the toroidal transformer does not, and cannot, match the 50-ohm line into the 500-ohm line, since its exciting impedance is, of necessity, much lower than the 500 ohms. This gives rise to a novel mode of operation in which a practical system can be obtained in which the criterion for optimum power-transfer is no longer impedance-matching through the transformer, but rather matching the 50-ohm line into the resistance presented by the toroidal transformer with its secondary connected to a high impedance of 500 ohms, which is essentially an open circuit, the inductive reactance, as viewed from the 50-ohm line, being compensated by the capacitor $C_1$.

The line-conductor which passes through the condenser-bushing and hence through the toroidal core 22 of the winding 23 is indicated in Fig. 2 at 11. It is represented as being grounded, at its terminal-end, as indicated at 30, and as merging, at its line-end, with the line-conductor C, which is represented by its characteristic impedance which is indicated as 500 ohms, the remote terminal of the line-conductor C being also grounded, as indicated at 31. The remote-end ground 31 is thus the equivalent of all of the equipment, at the remote end of the power-line section ABC, corresponding to the portion of Fig. 2 from the bushing-conductor 11 to the carrier-set 25, which is duplicated at said remote end. Thus, if a carrier-signal is transmitted from the carrier-set 25 at the illustrated terminal to the receiving part of the corresponding carrier-set 25 at the remote terminal, the carrier-current flows from the ground 30 in Fig. 2, through the bushing-conductor 11 and the line-conductor C, to the corresponding carrier-set at the other end of the line, represented by the ground 31.

To this end, means must be provided, as represented by the equivalent-circuit grounds 30 and 31 in Fig. 2, for selectively grounding the bus A'B'C', or selectively grounding the coupled-circuit phase C' of said bus, at each end of the protected line-section ABC, and this grounding-means must be effected through a circuit which selectively presents a high impedance, approaching insulation-magnitude, to power-currents, while selectively providing a ground-return path of a reasonably low impedance for carrier-currents.

Figure 4:
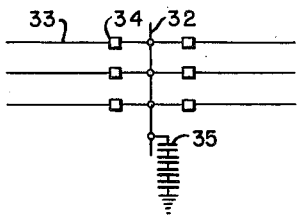

Any selective grounding-means for performing the stated purpose may be used. For example, in Fig. 4, I have shown a single-line diagram of a power-transmission system having a bus 32 to which six line-sections 33 are connected, through six circuit-breakers 34, each circuit-breaker being visualized as being equipped with series carrier-coupling equipment of its own distinctive carrier-frequency, similar to the apparatus thus far described in connection with Figs. 1 and 2. A single carrier-current ground may be provided, on the bus 32 by means of a single capacitor (or capacitor-string), which would be physically the same as a coupling-capacitor, as shown at 35, this capacitor being connected between the bus 32 and ground. A representative coupling-capacitor of the 69 kv. class has about .003 microfarad, representing about 880 ohms at 60 kilocycles, or 440 ohms at 120 kilocycles, which are representative carrier-current frequencies. This would provide an excellent path to ground for all six of the carrier-frequencies in Fig. 4, while providing substantially an open circuit with respect to the 60-cycle power-currents. The grounding means which is shown in Fig. 4 is objectionable, however, because it involves a coupling-capacitor 35 which is a power-size equipment, that is, it has to be designed for the high power-line voltage. It is thus fairly expensive, but since it is illustrated, in Fig. 4, as sufficing for six carrier-current systems, its cost would be divided among the six systems and might be tolerable.

It is very desirable, however, in the general application of my invention, to provide a much less expensive carrier-grounding means, which constitutes an individual part of the terminal carrier-equipment, so that each terminal carrier-equipment can be used, as a complete unit, as it stands, without relation to any other apparatus which may be associated with other line-sections which may be connected to the same bus A'B'C' at the same station or terminal. In accordance with one feature of my present invention, therefore, I provide means, associated with the bus-connected condenser-bushing 7, for selectively grounding the line-conductor 11 and C to which the toroidal transformer-winding 23 is coupled. The condenser-bushing 7 has a much lower capacitance, and hence a much higher carrier-frequency impedance, than the coupling-capacitor 35 of Fig. 4, and hence the condenser-bushing 7 of Fig. 1 is not suitable, as it stands, for adequately grounding the grounded end 30 of the conductor 11 in the equivalent circuit of Fig. 2.

In accordance with my invention, as shown in Fig. 1, I connect a tuning-coil 37 between the low-voltage tap 17 of the bus-connected condenser-bushing 7 and ground, and I tune it so that the combination consisting of the parallel-connected coil 37 and the low-voltage portion of the tapped bushing 7 is in substantially series-resonance with the remainder of the tapped bushing, with respect to the carrier-currents which are to be grounded. By this means, a low-impedance carrier-current path to ground is secured, without permitting the flow of any substantial power-frequency current to ground.

In general, the capacitance of the other bushing, or line-connected condenser-bushing 8, is so small that it will not bypass a significant amount of carrier-frequency current to ground. In some cases, it may be desirable, however, to reduce this leakage of carrier-current energy from the line-conductor C to ground through the bushing 8 at the line-side of the circuit-breaker 5C. To this end, I may use another tuning-coil 38, which is connected between the low-voltage tap 17 of the line-connected bushing 8 and ground, and which may be tuned into substantially parallel-resonance with the low-voltage portion of the tapped bushing 8, with respect to the particular carrier-current frequency or frequency-range which is being employed. This parallel-resonant circuit thus substantially blocks the flow of carrier-currents to ground, through the line-connected bushing 8.

As previously mentioned, a very significant thing, in connection with my invention, is that the impedance of my toroidal coupling-means 23, as seen from the secondary side, that is, from the single-turn or line-side 11 is not, and from the very nature of things cannot be, matched with respect to the impulse-impedance of the power-line conductor C, which will be an impedance of the order of magnitude of 500 ohms. In fact, the conditions are at just the other extreme, because the coupling-transformer impedance, as seen from the line-side 11, is only a fraction of one per cent of the characteristic impedance of the power-transmission line. The circumstances which make such a design possible, and the manner of designing the toroidal coupling-transformer, will now be explained.

It may be regarded as fundamental that my invention starts out with carrier-current transmitting and receiving equipment 25 of such nature that satisfactory reception is obtained, with a 30-watt carrier-current transmitter, at a power-level which is 30 decibels down from the transmitter-power, or 1/1000 of the transmitted power. A 5-watt transmitter would operate over 1/6 of the above power-ratio or $$\frac{1000}{6}=166$$

corresponding to a 22-decibel difference in power-level. The reason for thinking in these terms is that commercial-frequency power-transmission lines introduce about 0.1 decibel of attenuation per mile, so that a 22-decibel power-line would have a length of something like 220 miles in an illustrative case. Thus, in an acceptable carrier-current coupling-means, it is possible to accept an attenuation of a certain number of decibels in the series coupling and grounding equipment.

Since it is impossible to match the secondary or single-turn impedance of the coupling transformer to the approximately 500-ohm characteristic impedance of the power-transmission line-conductor, I design my toroidal transformer around the thought of getting as much carrier-frequency voltage into the secondary conductor 11 as possible, for a given input-power of W watts.

Considering the primary-winding or N-turn equivalent circuit of Fig. 2, the primary inductance, in henrys, is:

(1) $$L=\frac{3.19\mu AN^2\times 10^{-8}}{l}$$

where $A$ and $l$ are the core-dimensions in inches.

Figure 3:
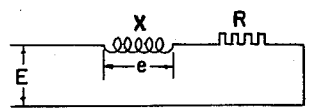
Figure 3 is an equivalent circuit-diagram of the primary or toroidal-winding circuit of the toroidal coupling-transformer; and, Figure 4 is a diagrammatic view of an alternative means for providing the selective ground-return path for the carrier-currents which are used with a fairly large number of power-line sections which are connected to a common bus.

Referring to the equivalent primary circuit of Fig. 3, the input-power is:

(2) $$W=I^2R=\frac{E^2R}{R^2+X^2}$$

By definition, the Q ratio of the inductance is $Q=X/R$, and hence (3) $$R=\frac{X}{Q}$$

and (4) $$W=\frac{E^2\frac{X}{Q}}{\frac{X^2}{Q^2}+X^2}=\frac{E^2}{XQ\left(\frac{1}{Q^2}+1\right)}$$

The primary reactance is:

(5) $$X=2\pi fL=\frac{20.04\mu AN^2 f\times 10^{-8}}{l}=k\mu N^2$$

where (6) $$k=\frac{20.04 Af\times 10^{-8}}{l}$$

A bushing-type transformer may be visualized as having a core having an area $A$ of from 6 to 10 square inches, and a length $l$ of from 12 to 15 inches.

From Equations 4 and 5, I may write the primary input-power as equal to:

(7) $$W=\frac{E^2}{k\mu QN^2\left(\frac{1}{Q^2}+1\right)}$$

and I may write the impressed primary voltage as being equal to:

(8) $$E=N\sqrt{kW\mu Q\left(\frac{1}{Q^2}+1\right)}$$

My object is to get as much induced voltage $e_s$ as possible into the secondary winding 11, and hence I want to consume as much of the primary voltage $E$ as possible in the voltage-drop $e$ which occurs across the primary reactance $X$, as indicated in Fig. 3. Because of the use of a toroidal primary core 22 having a symmetrically distributed primary winding 23 wound therearound, all of the primary-winding flux circulates around said toroidal core 22, and hence all of the primary-winding flux circulates around (is interlinked by) the secondary conductor 11, which acts as a single secondary turn. Hence, the mutual reactance of the transformer is equal to the primary reactance $X$, so that, if I put as much voltage $e$ as possible into the primary reactance $X$, I am also inducing as much voltage $e_s$ as possible into the secondary winding or turn 11.

From Fig. 3, it is evident that the voltage-drop across the primary reactance $X$ is equal to:

(9) $$e=\frac{EX}{\sqrt{R^2+X^2}}=\frac{EX}{X\sqrt{\frac{1}{Q^2}+1}}=\frac{E}{\sqrt{\frac{1}{Q^2}+1}}=N\sqrt{kW\mu Q}$$

Hence the secondary induced voltage is:

(10) $$e_s=\frac{e}{N}=\sqrt{kW\mu Q}$$

The result of the foregoing considerations is that, in the design of a series coupling-transformer, or series current-transformer for use with frequencies high enough so that the Q-ratio of the transformer must be considered—if I am given any frequency $f$, and any toroidal-core dimensions $A$ and $l$, thus fixing the value of the coefficient $k$ in Equation 10, and if I am given a certain number of primary watts $W$, then the amount of carrier-current energy which is introduced into the secondary circuit 11 is dependent upon the square root of the product $\mu Q$, so that the only design-requisite for the coupling transformer is that it shall have as high a $\mu Q$ as possible, at the carrier-current frequency for which it is designed. I believe this to be a new concept in coupling-transformer design.

The nature of the core-material of the toroidal core 22 of the coupling transformer must, therefore, be such as to have the highest value of $\mu Q$ which is compatible with cost-considerations, at the carrier-current frequency which is to be used. This core-material may be either a powdered core-material, which has a relatively high value of $\mu Q$ and a relatively low value of the permeability $\mu$, or it may be a thinly laminated magnetizable material, such as a thinly laminated oriented sheet-steel which has a fairly high permeability $\mu$, but a relatively low value of Q. It is quite feasible to wind the toroidal core 22 with a strip-lamination having a thickness of 2 mils, and possibly the winding of even a one-mil lamination-strip may not be fraught with too much difficulty, thereby still further reducing the losses and improving the Q. These various core-materials are known in principle, and any one of them may be chosen, which produces the highest value of $\mu Q$ which is compatible with cost-considerations. Core-materials having a $\mu Q$ of the order of from 3000 to 8000, or even higher, appear to be quite feasible.

Since my toroidal coupling-transformer has to have this special core-material having a high value of $\mu Q$, it will generally be preferable to use a specially designed toroidal transformer for the purpose of effecting the series carrier-current coupling to the line-conductor 11 and C, although there may be cases in which the same coupling-transformer could be used, at the same time, as a line-frequency bushing-type current-transformer, for ordinary relaying or metering purposes, at the power-line frequency of 60 cycles or the like.

In regard to the inherent inability to match the secondary impedances, in connection with my toroidal coupling-transformer, attention may be called to the fact that carrier-current systems are used in connection with power-transmission lines having relatively high values of attenuation, these values amounting to at least several decibels. If a power-input is introduced into a high frequency or distributed-capacity type of transmission-line having a small value of attenuation in the line, the matching of the equivalent input-impedance to the characteristic transmission-line impedance is quite important, because, without such matching, there will be a reflected wave, coming from the far end of the transmission-line, which is of a rather large magnitude, so that a relatively small amount of the input-power is actually transmitted through the transmission-line. Where the attenuation-constant of the transmission-line is high, however, the difficulties attendant upon mis-matching are much less critical, and this consideration helps to make it possible to use my present invention. In fact, the characteristic impedance of the power-circuit transmission-line is so large, with respect to the equivalent impedance of my input-power apparatus, that the power-line looks like practically an open circuit to the input-power apparatus.

The 60-cycle power-current in the secondary winding 11 of the toroidal transformer 22 (Fig. 2) will have two effects. It will tend to cause modulation by a 120-variation of the permeability of iron core 22, and it will tend to cause saturation of the core at high power-currents, with consequent loss of carrier-efficiency. To overcome these effects, the 60-cycle voltage may be effectively short-circuited by a drain-coil 40 which is connected in parallel across the primary winding 23, as shown in Fig. 2. The drain coil has a low impedance to 60 cycles and a high impedance to the carrier-frequencies, so that it does not drain off any appreciable carrier current.

In discussing my carrier-current system, I have not made any mention of the use to which the carrier-current will be put, as such use has nothing to do with the nature of the coupling, aside from the fact that the receiver-parts of the carrier-sets 25 shall have sufficient sensitivity to satisfactorily respond to the received carrier-current energy after its attenuation in the process of being transmitted from transmitter to receiver. My carrier-current system can be used for any purpose for which carrier-currents are now used, in connection with power-transmission lines, such purposes including protective relaying, communication, remote metering and control, and the like.

While I have illustrated and described my invention in one or more exemplary forms of embodiment, I wish it to be understood that various changes may be made in embodying my invention, without departing from the essential spirit thereof, and I desire that the appended claims shall be accorded the broadest construction consistent with their language.

I claim as my invention:

1. In a commercial-frequency electric-power transmission-system including a line-section comprising a plurality of line-conductors for transmitting power from a bus at one station to a bus or buses at another station or stations, said line-section having line-sectionalizing circuit-interrupting means for the several line-conductors at each terminal of the line-section, each circuit-interrupting means comprising a metal circuit-interrupter housing, having a bus-connected terminal-bushing and a line-connected terminal-bushing extending through bushing-openings in said metal circuit-interrupter housing for each line-conductor; the combination, with a selected one of said line-conductors and the terminal-bushings thereof at each one of a plurality of line-section terminals, of a carrier-current transmitter-receiver set of such relatively high frequency or frequencies that said selected line-conductor presents substantially its surge-impedance to said carrier-currents, a toroidal inductance-means for each carrier-current set, said toroidal inductance-means being disposed inside one of the bushing-openings in spaced relation around the corresponding terminal-bushing, said toroidal inductance-means comprising a carrier-frequency magnetizable core of toroidal shape and a substantially uniform and symmetrically distributed winding around said toroidal core, said winding being connected to the associated carrier-current set, and means for selectively grounding the bus-end of the selected line-conductor at each one of said plurality of line-section terminals through a circuit which selectively presents a high impedance approaching insulation-magnitude to power-currents and which selectively provides a ground-return path of a reasonably low impedance for carrier-currents.

2. The invention as defined in claim 1, characterized by each toroidal inductance-means being associated with the line-connected terminal-bushing of its associated circuit-interrupting means.

3. The invention as defined in claim 1, characterized by each toroidal inductance-means being associated with the line-connected terminal-bushing of its associated circuit-interrupting means, said line-connected terminal-bushing having a low-voltage tap near its grounded portion, in combination with an inductance-device connected between said tap and ground and tuned to substantially parallel resonance with the low-voltage portion of the tapped bushing, with respect to carrier-currents, so as to reduce the leakage of carrier-currents to ground.

4. The invention as defined in claim 1, characterized by each toroidal inductance-means being associated with the line-connected terminal-bushing of its associated circuit-interrupting means, said bus-connected terminal-bushing at at least one of said plurality of line-section terminals having a low-voltage tap near its grounded portion, in combination with an inductance-device connected between said tap and ground and tuned so that the combination consisting of the parallel-connected inductance-device and the low-voltage portion of the tapped bushing is in substantially series resonance with the remainder of the tapped bushing, with respect to carrier-currents, so as to provide the selective grounding-means at said one of said plurality of line-section terminals.

5. In a commercial-frequency electric-power transmission-system including a line-section comprising a plurality of line-conductors for transmitting power from a bus at one station to a bus or buses at another station or stations, said line-section having line-sectionalizing circuit-interrupting means for the several line-conductors at each terminal of the line-section, each circuit-interrupting means comprising a metal circuit-interrupter housing, having a bus-connected terminal-bushing and a line-connected terminal-bushing extending through bushing-openings in said metal circuit-interrupter housing for each line-conductor; the combination, with a selected one of said line-conductors and the terminal-bushings thereof at each one of a plurality of line-section terminals, of a carrier-current set of such relatively high frequency or frequencies that said selected line-conductor presents substantially its surge-impedance to said carrier-currents, means for serially coupling each carrier-current set to said selected line-conductor at the respective line-section terminals, and means for selectively grounding the bus-end of the selected line-conductor at each one of said plurality of line-section terminals through a circuit which selectively presents a high impedance approaching insulation-magnitude to power-currents and which selectively provides a ground-return path of a reasonably low impedance for carrier-currents, said bus-connected terminal-bushing at at least one of said plurality of line-section terminals having a low-voltage tap near its grounded portion, in combination with an inductance-device connected between said tap and ground and tuned so that the combination consisting of the parallel-connected inductance-device and the low-voltage portion of the tapped bushing is in substantially series resonance with the remainder of the tapped bushing, with respect to carrier-currents, so as to provide the selective grounding-means at said one of said plurality of line-section terminals.

EDWIN L. HARDER.

No references cited.